Jan. 30, 1945.    A. BOYNTON    2,368,407
REMOTELY CONTROLLED FLOW VALVE
Filed Dec. 6, 1941    2 Sheets-Sheet 1
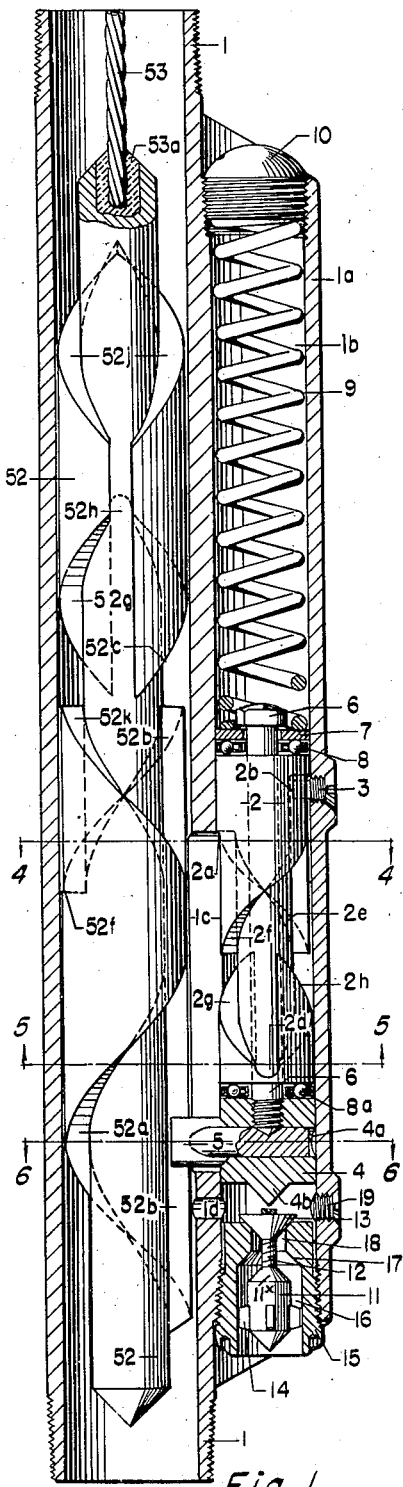
ALEXANDER BOYNTON,
INVENTOR,
BY John R. Robertson
ATTORNEY.

Jan. 30, 1945.  A. BOYNTON  2,368,407
REMOTELY CONTROLLED FLOW VALVE
Filed Dec. 6, 1941  2 Sheets-Sheet 2
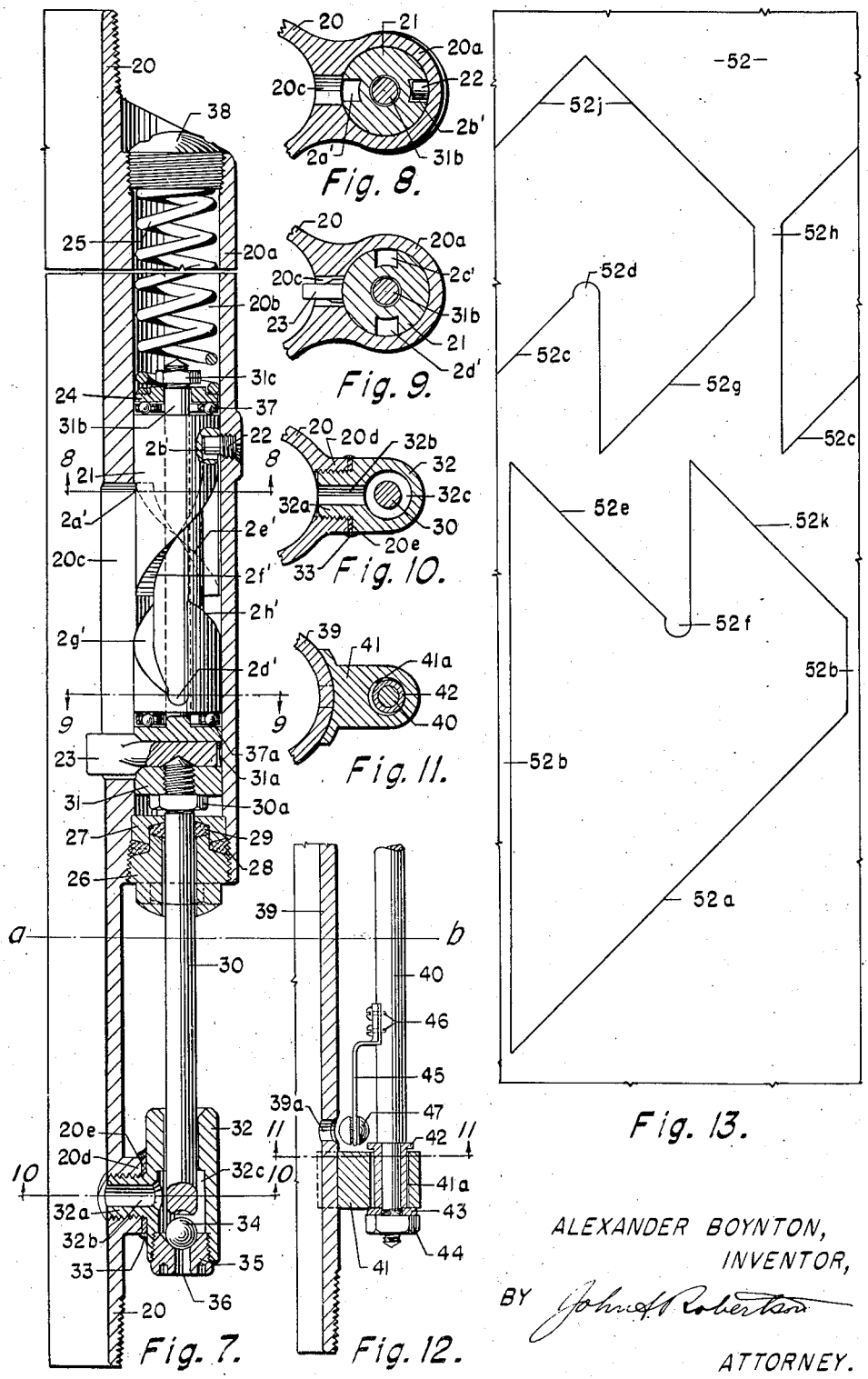
ALEXANDER BOYNTON,
INVENTOR,
BY *John A. Robertson*
ATTORNEY.

Patented Jan. 30, 1945

2,368,407

UNITED STATES PATENT OFFICE 2,368,407

REMOTELY CONTROLLED FLOW VALVE

Alexander Boynton, San Antonio, Tex.; Sida S. Martin executrix of said Alexander Boynton, deceased Application December 6, 1941, Serial No. 421,935

18 Claims. (Cl. 103—233)

My invention relates to remotely controlled flow valves for wells and deals with the general subject of my copending application Serial Number 421,934 filed Dec. 6, 1941.

The principal object is to provide a flow valve that can be opened or closed selectively by means of a tool on a cable operated from the ground surface and which may be removed from the well in order to leave the flow tubing unobstructed.

Another object is to provide a series of valve controlled spaced openings in the tubing of a well, a selective one of said valves being open while the others are closed selectively.

Another object is to improve the ordinary automatic opening and the frequently uncertain closing of the now generally used automatic flow valves by substituting therefor a manually and remotely controlled valve opening and closing means of positive action.

Another object is to provide a flow device especially adapted to deep wells because of its positive operation, due to freedom from control by differential force, resulting in tubing withdrawals being seldom necessary.

Another object is to provide a remotely controlled flow valve which does not restrict the tubing passage.

A further object is to provide a series of flow valves having the advantages set out in the foregoing objects and which, in addition thereto, can be quickly and inexpensively adapted for flowing a well through the casing, instead of through the tubing.

Other related objects are to provide remote controls for valves in cooling plants, ventilating systems, pipe lines, refineries, mines, production testing devices, well cementing equipment, and all other valves requiring remote control, including means for discharging liquids and gases at predetermined locations in warfare. Many defensive systems have been contemplated and proposed in which a remotely controlled valve as herein provided would be advantageous. Thus poison gas could be released with the operator of the valve at a safe distance.

I attain the foregoing objects by means of a piston-like actuator in a lateral shell upon a nipple adapted to be connected into the eduction tubing of a well. The actuator has a series of external slots, pockets, and helically inclined cam surfaces adapted to impart rotary movement to it by contacting a stationary pin in the shell during longitudinal movements of the actuator, which movements are caused by a releasing connection engageable with a pin in the actuator; whereby the actuator will unoppose or resiliently oppose differential force employed to urge a valve toward its seat to control the flow of pressure fluid into the tubing, as will appear more fully in the following specification and the accompanying drawings, in which—

Fig. 1 is mainly a longitudinal section through the preferred embodiment of the device showing the pressure fluid intake valve open with the releasing connection and portions of the device in outside view.

Fig. 2 is a partial longitudinal section through the preferred embodiment of the device showing the pressure fluid intake valve closed, portions of the inner parts being shown in outside view.

Fig. 3 is a diagram of the slots, pockets, and helically inclined cam surfaces of the actuator.

Fig. 4 is a cross section on the line 4—4, Fig. 1.

Fig. 5 is a cross section on the line 5—5, Fig. 1.

Fig. 6 is a cross section on the line 6—6, Fig. 1.

Fig. 7 is mainly a longitudinal section through a modified construction, some of the parts being shown in outside view.

Fig. 8 is a cross section on the line 8—8, Fig. 7.

Fig. 9 is a cross section on the line 9—9, Fig. 7.

Fig. 10 is a cross section the line 10—10, Fig. 7.

Fig. 11 is a cross section through another modification, this view being taken on the line 11—11, Fig. 12.

Fig. 12 is a longitudinal section through a portion of the modified construction shown cross sectioned in Fig. 11, the remainder of this construction being the same as shown in Fig. 7 above the line a—b.

Fig. 13 is a diagram of the slots, pockets, and helically inclined cam surfaces of the releasing connection.

Similar characters of reference are employed to designate similar parts throughout the several views of each embodiment.

In Fig. 1, the nipple 1, having the lateral slot 1c and the pressure fluid intake port 1d, is adapted to be connected at intervals into the eduction tubing of a well. The lateral shell 1a, which may be cast of steel integrally with the nipple 1, has the smooth bore 1b within which the actuator 2 and the actuator pin piston 4 are slidable. This piston, having the pointed lower end 4b, has the cross bore 4a which closely receives the actuator pin 5, which has a head slidable within the slot 1c of the nipple 1 and extends a short distance, such as one-fourth inch, within the axial flow passage through the nipple. The guide pin 3 is firmly secured in the shell 1a and extends thereinto far enough to become engaged within and upon the pockets and helically inclined cam surfaces of the actuator, as will appear further on.

The axle bolt 6 is received, with slight clearance, within an axial opening through the actuator 2 and has threaded engagement with the piston 4. The pointed lower end of this bolt engages within a conical depression in the pin 5, whereby the pin is secured firmly within the piston. The washer 7 is engaged under the head of the bolt 6 and upon the thrust bearing 8 which urges the actuator 2 downward by force of the actuator spring 9, confined within the bore 1b by the plug 10 employed to close the upper end of the shell 1a. The thrust bearing 8a is confined between the actuator 2 and the piston 4, the head of the bolt 6 having a slight clearance with the washer 7 in order that the bearings 8 and 8a will be free.

The plunger sleeve 15, secured within the shell 1a, has formed within it the plunger chamber 16, the axial pressure fluid passage 18, and the closure seat 17 formed around the lower end of the passage 18. The plunger 11, having its upper end formed into a valve engageable with the seat 17, has proper clearance around it for pressure fluid employed to flow the well, and has the fins 14 loosely slidable within the chamber 16. The screw 19 is employed to close the opening made in drilling the port 1d.

The plunger extension 12, having its upper end formed with a conical recess adapted to receive the pointed end 4b of the piston 4, is secured to the plunger 11, and has the check valve 13 adapted to engage upon a seat of the sleeve 15. The plunger extension 12 has some clearance with the pointed end 4b of the piston 4 when the device is open to intake pressure fluid in order that the check valve 13 may be unseated far enough to allow proper inflow of pressure fluid. This check valve retains the plunger in the chamber 16 and will prevent well liquid from draining out of the tubing through the devices during intervals between flowing operations.

The fins 14 of the plunger are for the purpose of guiding the plunger to concentrically engage the seat 17. The pointed end 4b of the piston 4 holds the closure seat engaging surface 11x of the plunger 11 away from its seat 17 when the guide pin 3 is engaged within the deep upper pin pocket 2b, as appears in Fig. 1, and the pressure fluid urges the plunger to engage that seat when the pin 3 is engaged within the shallow upper pin pocket 2a, as appears in Fig. 2.

The actuator assembly is adapted to become stationary in two positions. One of these positions is when the guide pin 3 is contained in the deep pin pocket 2b, this being the open position of the device, as in Fig. 1. The other stationary position of the actuator is when the pin 3 is engaged within the shallow pin pocket 2a, this being the closed position of the device, as in Fig. 2. The spring 9 constantly urges the actuator downward to one of these positions.

It will be observed in Fig. 3 that the upper pin pockets and helically inclined cam surfaces are rotatably offset with relation to the position of the lower pin pockets and helically inclined cam surfaces; that is, the shallow pocket 2a is opposed by the lower helically inclined cam surface 2g; the deep pocket 2b is opposed by the lower helically inclined cam surface 2h; the lower pin pocket 2c is opposed by the upper helically inclined cam surface 2e; and the lower pin pocket 2d is opposed by the upper helically inclined cam surface 2f.

The inclined cam surfaces 2e, 2f, 2g, and 2h, and the lower pin pockets 2c and 2d, manipulate the actuator by reason of its various contacts with the guide pin 3, as will be explained under operation of Figs. 1 and 2.

The spring 9 is adapted to perform the double service of moving the actuator downward and of loading the plunger 11 if the extension 12 be properly spaced relative to the pointed end 4b of the piston, as will be mentioned again under operation of Figs. 1 and 2.

Installation

By way of illustrating the best presently known mode of applying the invention, it will be understood that any of the devices herein disclosed may be installed in series at spaced intervals in the eduction tubing of a well. The distance between proximate devices may be, for example, 200 to 500 feet. Any desired number of devices may be employed, series of three to seven being adapted to meet the most ordinary well conditions.

When the device is open, as in Fig. 1, the pointed end 4b of the piston 4 will contact the recessed end of the plunger extension 12 and hold the plunger open away from its closure seat 17.

When the device is closed as in Fig. 2, the force of pressure fluid exterior of the device will cause the plunger to seat and close the pressure fluid passage 18, as in Fig. 2.

Operation, Figs. 1 and 2

In all forms of the invention, the guide pin secured in the lateral shell being contacted alternately by the upper and lower inclined cam surfaces of the actuator, governs all rotary movements thereof and consequently controls the opening and closing movements of the pressure fluid control valve. The actuators are longitudinally and rotatably movable within the shell, both movements taking place simultaneously and as the result of the cable pull upward upon the actuators or of the downward force of the actuator springs.

The path of pressure fluid through the open device is via the plunger chamber 16, the axial pressure fluid passage 18, above which the check valve 13 will be raised slightly, and the intake port 1d, in the order named.

The actuator pin 5 which extends slightly into the axial flow passage through the nipple, is adapted to be releasably engaged by the operating tool 52, Figs. 1 and 13, in a manner to be described further on.

To close the device, it being open as in Fig. 1 wherein the guide pin 3 is engaged within the deep pocket 2b, proceed as follows: Attach the operating tool 52 to the actuator pin 5 and pull the actuator 2 upward. The lower inclined cam surface 2h will contact the guide pin 3 and will cause the actuator to be rotated slightly until this pin will be engaged within the lower pin pocket 2c. Then, release the pull upon the actuator pin 5; whereupon the spring 9 will force the actuator downward, causing the upper inclined cam surface 2e to contact the pin 3; whereby the actuator will be rotated further until the shallow upper pocket 2a will contain the pin 3, as in Fig. 2.

To open the device, it being closed as in Fig. 2.

wherein the guide pin 3 is engaged within the shallow upper pocket 2a, proceed as follows: Attach the operating tool 52 to the actuator pin 5 and pull the actuator 2 upward. The lower inclined cam surface 2g will engage the guide pin 3 and cause the actuator to be rotated slightly until this pin will be engaged within the lower pocket 2d. Then, release the pull upon the actuator pin 5; whereupon the spring 9 will force the actuator downward, causing the upper inclined cam surface 2f to contact the pin 3; whereby the actuator will be rotated further until the deep pocket 2b will contain the pin 3 again, as in Fig. 1.

If the distance between the surface 11ˣ of the plunger extension 12 and the pointed end 4b is less than the distance between the plunger 11 and the closure seat 17, the actuator spring 9, if of proper strength, will act to spring load the plunger in a manner well known to the art and cause the plunger to close the pressure fluid passage 18 at a predetermined differential. The threaded connection of the valve 13 upon the extension 12 affords means for spacing said extension relative to the pointed end 4b of the piston 4.

The operating tool

An operating tool is necessary to the use of this invention and the best means known to this applicant whereby the devices illustrated in Figs. 1, 2, 7, and 12 can be operated is shown at 52. This tool comprises a series of slots, pockets, and helically inclined cam surfaces formed upon the surface of a one piece shaft-like rod member appearing in Figs. 1 and 13. This tool may be lowered into the tubing by means of the cable 53 upon which it is shown secured by the solder or babbitt 53a, Fig. 1. The operating tool, free to be rotated, thereby slightly twisting the proximate portion of the cable with it, is shunted axially by its inclined surfaces contacting the actuator pin 5, whereby the tool, as it is reciprocated, alternately engages and releases this pin. After each pull upon the pin, the tool may be lowered through the device and then withdrawn from the well or it may be lowered to the next device for similar action.

When the tool 52 encounters the actuator pin 5, Figs. 1 and 2, the lower guide slope or cam surface 52a will rotate the tool to receive the pin within the entrance slot 52b see Fig. 13. The first upper helically inclined cam surface 52c will rotate the tool to engage the pin within the upper pin pocket 52d, which arrests the downward movement of the tool. Then, when the tool is raised, the first lower helically inclined cam surface 52e will cause the lower pin pocket 52f to contain the pin; whereby the actuator 2 will be raised and the guide pin 3 will be contained in one of the upper pin pockets 2a or 2b; thereby opening the device if the pin contact was changed from within the pocket 2a to within the pocket 2b, and closing the device if this change was from the pocket 2b to the pocket 2a. When the cable pull is released, the second upper helically inclined cam surface 52g will rotate the tool so as to allow the exit slot 52h to pass over the pin. The tool is then free to be lowered to the next device or to be withdrawn from the tubing through the device or devices above it.

In raising the tool 52 through the devices, the upper guide slopes or cam surfaces 52j will rotate the tool to receive the pin 5 within the slot 52h. The second lower helically inclined cam surface 52k then rotates the tool slightly as it is raised until the slot 52b will cause the tool to clear the pin.

It will be noted that one cable pull upon the tool 52 will change the device from open to closed, and vice versa. Manifestly, two cable pulls, spaced by a release of the tool, will enable the tool to be passed through any device; thereby leaving that device in the same position as before being pulled upon the first time. Thus the first pull changes the original condition of the device, whatever it might be, but the second pull restores the device to its original condition. Any change in the device is only temporary and of the briefest duration, if it is desired to lower the tool past a device and leave it in the condition in which it is found.

The outstanding operative characteristic of the tool 52 is as follows: It will land upon each device upon which it is lowered. Then one pull upon the tool will open the device, if closed or close the device, if open. The tool then may be lowered through the device which has last been pulled upon, after which it may be either raised out of the well or lowered to the next device to open it if closed or to close it if open, as was stated for the action of the tool upon the valve above.

For illustration, it will be assumed that there are several devices in a well, and that the upper device is open, all other devices being closed. Now, to close the upper device and open the third device, for example, proceed as follows: Lower the operating tool 52 until it contacts the upper device and pull once. That will close the upper device. Then, lower the tool to the second device which is closed and which it is desired to leave closed. Pull upon this device twice. In doing so land the tool upon the device and pull once. Then lower the tool through it and raise the tool above it. Then lower the tool upon the device again and pull once more. Then lower the tool through the device which will leave it closed. Lower the tool upon the third device which is closed and pull once more. That will open it. Then lower the tool slightly below the third device. The tool may be withdrawn then through the upper devices without stopping and without changing any one of the valve positions.

It is apparent that the device illustrated in Figs. 1 and 2 may be converted into a casing flow device by closing the port 1d and opening the passage closed by the screw 19, at the same time closing the lower end of the plunger chamber 16 and providing another opening into the nipple 1 below the check valve 13. Such a device would employ the tubing as an induction means for pressure fluid while the annular space between the tubing and the casing would become the eduction conduit for well liquid.

First modification

Fig. 7, illustrating the modified construction, differs from the preferred embodiment in the pressure fluid valve control mechanism and other structural details only.

The nipple 20, having the lateral shell 20a, the slots 20c, and the lateral boss 20d, is adapted to be connected into the eduction tubing of a well, in like manner as the nipple 1 in Figs. 1 and 2. The actuator 21, having the rod-like extension 31b of the actuator pin piston 31 extending loosely through it and secured with end clearance to it by the nut 31c, is slidable within the smooth bore 20b of the lateral shell 20a. The guide pin 22, firmly secured in the shell, extends into the bore 20b of the shell where the upper helically inclined cam surfaces 2e' and 2f' and the lower helically inclined cam surfaces 2g' and 2h' of the actuator are slidable over this pin. In like manner the shallow upper pin pocket 2a', the deep upper pin pocket 2b', and the lower pin pockets 2c' and 2d' are engageable with it; whereby the actuator controls the open and closed positions of the ball valve 34, as will be explained more fully under operation of Fig. 7.

It will be observed that the relative position of the pin pockets and inclined cam surfaces of the actuator 21 are similar to the pin pockets and inclined cam surfaces of the actuator 2 in Figs. 1, 2, and 3, the same numerals and letter suffixes being employed to designate the similar pockets and inclined cam surfaces in both constructions with the suffixes primed in the modification.

The actuator spring 25, within the bore 20b and confined therein by the plug 38 constantly urges the actuator 21 downward by urging the circular plate 24 to engage the thrust bearing 37 and also urging the other end of the actuator to engage the thrust bearing 37a. Thus, the actuator is free to move axially without imparting appreciable torque to the plate 24 or to the piston 31.

The valve control rod 30, slidable through the gland sleeve 26, the gland roof 27, and the packing 29, is secured within the piston 31 and is locked there by the lock nut 30a. This rod has a pointed upper end engageable within a conical depression in the actuator pin 23, whereby this pin, having its head slidable in the slot 20c, is secured firmly within the cross bore 31a. The gland roof 27, which may be pressed in against an annular shoulder within the shell 20a, as appears in Fig. 7, has the packings 28 and 29 pressed against it by the gland sleeve 26, having threaded engagement within the lower extremity of the shell.

The valve housing 32 has the lateral boss 32a threadedly secured within the boss 20d of the nipple 20. This housing is aligned with the shell 20a by means of the spacer washer 20e which is of proper thickness to produce such alignment when the threads of the mating bosses are engaged tightly. This alignment may be secured by the weld 33 upon the boss 20d and the valve housing 32.

The rod 30 restrains the ball valve 34 from closing the pressure fluid intake port 32b when the guide pin 22 is contained within the deep upper pin pocket 2b' of the actuator 21, that being the open position of the device. This ball will be forced upward by the pressure fluid and will close the intake port 32b when the rod 30 is raised and the guide pin 22 is contained within the shallow upper pocket 2a', this being the closed position of the device.

During intervals between flowing operations, the valve 34 will fall back upon the valve retainer 35 and act as a check valve to close the inlet opening 36 and to prevent well liquid in the tubing from draining out through any device, if the pressure fluid force exterior thereof should be insufficient to hold this valve seated over the intake port 32b.

If the clearance around the ball valve 34 in the chamber 32c be properly limited the ball 34 will be spring loaded by the actuator spring 25, as will be apparent to those skilled in the art.

*Operation, Fig. 7*

The path of pressure fluid through the open device is via the inlet opening 36, the chamber 32c, and the pressure fluid intake port 32b.

The actuator pin 23, similar to the pin 5 in Figs. 1 and 2, is adapted to be releasably engaged by the operating tool 52.

To close the device, it being open as in Fig. 7 wherein the guide pin 22 is engaged within the deep pin pocket 2b', proceed as follows: Attach the operating tool 52 to the actuator pin 23 and pull the actuator upward. The lower inclined cam surface 2h' will contact the guide pin 22 and will cause the actuator to be rotated slightly until this pin will become engaged within the lower pin pocket 2c' (see Fig. 9), this pocket corresponding to the pocket 2c in Fig. 3. Then, release the pull upon the actuator pin 23; whereupon the spring 25 will force the actuator downward, causing the upper inclined cam surface 2e' to contact the pin 22; whereby the actuator will be rotated further until the shallow pin pocket 2a' will contain the pin. At that time, the valve control rod 30 will be raised so that the ball 34 will be forced by pressure fluid outside of the device to close the pressure fluid intake port 32b. To again open the device, attach the operating tool 52 to the actuator pin 23 and pull the actuator 21 upward. The lower inclined cam surface 2g' will engage the guide pin 22 and will cause the actuator to be rotated slightly until this pin will be engaged within the lower pin pocket 2d'. Then, release the pull upon the actuator pin 23; whereupon the spring 25 will force the actuator downward and will cause the upper inclined cam surface 2f' to contact the pin 22; whereby the actuator will be rotated further until the deep pin pocket 2b' will contain the pin again, as in Fig. 7.

When the device is open as in Fig. 7, the rod 30 will prevent the valve 34 from closing the intake port 32b.

While I have explained the operating tool 52 in connection with Figs. 1, 2, and 3, it will be understood that the operation will be the same when applied to Fig. 7, wherein the pin pockets 2a', 2b', 2c', and 2d' correspond to the similar pockets 2a, 2b, 2c, and 2d, respectively, in Figs. 1, 2, and 3; and the inclined cam surfaces 2e', 2f', 2g', and 2h' in Fig. 7 correspond to the inclined cam surfaces 2e, 2f, 2g, and 2h, respectively, in Figs. 1, 2, and 3.

To convert the device illustrated in Fig. 7 from a tubing flow means to a casing flow means: Move the ball valve 34 to above the intake port 32b, close the inlet opening 36, and provide another opening through the valve housing 32 above the ball.

*Second modification*

In Fig. 12, I illustrate a second modified construction wherein the valve mechanism constitutes the only departure from the construction illustrated in Fig. 7. The device shown partially in Fig. 12 may be considered as being completed above the line a—b by the construction shown above the line a—b in Fig. 7.

The nipple 39, having the pressure fluid inlet port 39a with a valve seat formed around its outer end, may be similar to the nipple 20 in Fig. 7. The valve control rod 40 also corresponds to the rod 30 in Fig. 7. The slide valve 41, slidable over the smooth outer surface of the nipple 39, is adapted to open and close the pressure fluid inlet port 39a. The spacer sleeve 42, engageable with an annular shoulder upon the rod 40, is secured upon the rod by the nut 44, the washer 43 being impinged between the nut and the sleeve to retain the valve. The valve 41 has the internal annular clearance 41a with the rod and has end clearance between the washer and the flange of the sleeve for the obvious purpose of enabling the valve to be free. The flat spring 45, secured upon the rod 40 by the screws 46, has a slotted lower end within which a reduced portion of the valve 47 is received and where the valve is secured opposite the intake port 39a by crimping the slotted end of the spring, as appears.

When the device is open to intake pressure fluid, as in Fig. 12, the guide pin 22, Fig. 7, will be engaged within the deep upper pin pocket 2b'. At this time, the ball valve 47 is supported resiliently opposite and in spaced relation to the pressure fluid intake port 39a, which port it will close by force of pressure acting upon this valve during the existence of predetermined high differentials, in order to avoid wasting pressure fluid through the open device during times when there may be an inadequate supply of well liquid in the eduction tubing above such a device.

When the guide pin 22 is engaged within the shallow upper pin pocket 2a', Fig. 7, the slide valve 41 will be centrally over the port 39a and will close it by force of the pressure fluid in the annular space between the tubing and the well casing.

*Operation, Fig. 12*

This second modified construction being the same as is illustrated in Fig. 7 above the line a—b, only the differential valve mechanism will be discussed here.

Pressure fluid enters the open device through the intake port 39a.

During high differentials, the differential spring 45 will yield, causing the valve 47 to engage the external seat around the port 39a; thereby cutting off the entrance of pressure fluid until lower differentials will cause the valve to open again.

While I have shown the guide pin stationary and the actuator movable, it is apparent that the pin pockets and inclined cam surfaces of the actuator may be placed in the stationary shell and the guide pin may be transferred from the shell to the movable actuator. It is also apparent that the position of the pin pockets and direction of the inclined cam surfaces of the actuators may be reversed; also, that the same changes may be made in the operating tool 52, in which event the slots 52b and 52h would be moved accordingly.

It is to be understood that all references to positions and directions such as "upper" and "lower," "upward" and "downward," "above" and "below" apply to the device as illustrated in the accompanying drawings wherein the upper portion of the device is shown uppermost.

Obviously, many other mechanical changes, substitutions, and adaptations may be made in the construction and that equivalents may be substituted for the parts shown; and I reserve the right to make such mechanical changes, substitutions, and adaptations within the scope of the invention as herein disclosed.

I claim:

1. In a differential flow device adapted to be remotely controlled by an operating tool in a tubing: a nipple adapted to be connected into said tubing; a lateral shell on said nipple, said nipple and shell having adjoining walls formed with a slot and a pressure fluid intake port therein; an actuator pin piston slidable in said shell; an actuator upon said piston and having a peripheral opening therearound, said opening forming two upper and two lower opposed helically inclined cam surfaces in spaced offset relation to each other, and sloping in opposite directions, two upper pockets, one deep and the other shallow, alternating between said upper cam surfaces, and two lower pockets alternating between said lower cam surfaces, said actuator being slidable in said shell, and rotatable relative to said piston; an actuator spring urging said actuator and piston downward in said shell; an actuator pin in said piston and extending slightly into said nipple, said pin being slidable in said slot and engageable by said tool; a plunger sleeve in the lower end of said shell and having a plunger chamber therein, a pressure fluid passage axial of said chamber, and a closure seat between said chamber and passage; a plunger in said chamber and in spaced relation to said seat and adapted to engage same to close said passage; an extension on said plunger; a check valve on said extension, said valve normally closing said passage and spacing said plunger relative to said seat; and a guide pin in said shell, said pin extending into said opening and being adapted to alternately engage within one of said pockets and upon one of said cam surfaces to cause partial rotation of said actuator each time said actuator is reciprocated a predetermined distance so as to resist said plunger in closing said passage when said guide pin is engaged within said deep upper pocket and to offer no resistance to said plunger when said guide pin is engaged within said shallow upper pocket.

2. In a differential flow device adapted to be remotely controlled by an operating tool in a tubing: a nipple adapted to be connected into said tubing; a lateral shell on said nipple and having a pressure fluid passage in the lower end thereof, said passage having a closure seat therearound, said nipple and shell having adjoining walls formed with a slot and a pressure fluid intake port; an actuator pin piston slidable in said shell; an actuator upon said piston and having a peripheral opening therearound, said opening forming two upper and two lower opposed helically inclined cam surfaces in spaced offset relation to each other, and sloping in opposite directions, two upper pockets, one deep and the other shallow, alternating between said upper cam surfaces, and two lower pockets alternating between said lower cam surfaces, said actuator being slidable in said shell, and rotatable relative to said piston; an actuator spring urging said actuator and piston downward in said shell; an actuator pin in said piston and extending slightly into said nipple, said pin being slidable in said slot and engageable by said tool; a double valve in said passage, one said valve acting as a check valve to normally close said passage and to space the other said valve from said closure seat; means for spacing said double valve relative to said piston; and a guide pin in said shell, said pin extending into said opening and being adapted to alternately engage within one of said pockets and upon one of said cam surfaces to cause partial rotation of said actuator each time said actuator is reciprocated a predetermined distance so as to resist said plunger in closing said passage when said guide pin is engaged within said deep upper pocket and to offer no resistance to said plunger when said guide pin is engaged within said shallow upper pocket.

3. In a differential flow device adapted to be remotely controlled by an operating tool in a tubing: a nipple adapted to be connected into said tubing; a lateral shell on said nipple, said nipple and shell having adjoining walls formed with a slot and a pressure fluid intake port therein; an actuator pin piston slidable in said shell; an actuator upon said piston and formed with a peripheral opening extending thereabout, said opening having pockets and helically inclined cam surfaces, said actuator being slidable in said shell, and rotatable relative to said piston; an actuator spring urging said actuator and piston downward in said shell; an actuator pin in said piston and extending slightly into said nipple, said pin being slidable in said slot and engageable by said tool; a differential valve adapted to control the flow of pressure fluid through said intake port into said nipple, said valve being coefficient with said actuator spring to provide resistance to said valve in closing said passage; and a guide pin in said shell, said guide pin being coefficient with said cam surfaces and pockets to alternately cause said valve to be open by force of gravity and by said gravity force plus the force of said spring, substantially as described.

4. In a flow device adapted to be remotely controlled from a tubing having an axial bore and formed with a passage for the flow of pressure fluid into said bore: a spring loaded piston in a shell; an actuator on said piston and rotatable relative thereto; a thrust bearing between said spring and actuator; a thrust bearing between said actuator and piston; an actuator pin secured in said piston and extending outward of said shell into said bore; and a valve controlling said passage and coefficient with said spring to close said passage at a predetermined differential between lesser fluid force in said tubing and greater force exterior thereof; in combination with a guide pin in said shell, said pin being coefficient with cam surfaces and pockets on said actuator to cause said actuator to alternately resist and offer no resistance to said valve in closing said passage, substantially as described.

5. In a differential flow device adapted to be remotely controlled by an operating tool in a tubing: a nipple adapted to be connected into said tubing and formed with a pressure fluid intake port; a lateral shell on said nipple, said nipple and shell having adjoining walls formed with a slot therein; closure means for one end of said shell; an actuator pin piston slidable in said shell; an actuator upon said piston and having a peripheral opening therebout, said opening forming; two upper and two lower opposed helically inclined cam surfaces in spaced offset relation to each other, said opposed cam surfaces sloping in opposite directions; two upper pockets, one deep and the other shallow, alternating between said upper cam surfaces; and two lower pockets alternating between said lower cam surfaces, said actuator being slidable in said shell and rotatable relative to said piston; an actuator spring urging said actuator and piston away from said closure means; an actuator pin in said piston and extending slightly into said nipple, said pin being slidable in said slot and engageable by said tool; a valve housing on said nipple, said housing being aligned with and in spaced relation to said shell, said housing providing communication with said intake port; a ball valve in said passage, said valve being adapted in two positions thereof to close said passage; a valve control rod on said piston, said rod being slidable hermetically through one end of said shell and being adapted in one position to limit the movement of said valve to maintain said passage open and in another position to be removed from said valve; and a guide pin in said shell, said pin extending into said opening and being adapted to alternately engage within one of said pockets and upon one of said cam surfaces to cause partial rotation of said actuator each time said actuator is reciprocated a predetermined distance so as to place the outer end of said rod proximate said valve to restrain it from moving to close said passage when said guide pin is engaged within said shallow upper pocket and to move away from said valve when said guide pin is engaged within said deep upper pocket.

6. In a differential flow device adapted to be remotely controlled by an operating tool in a tubing: a nipple adapted to be connected into said tubing and having a pressure fluid intake port; a shell thereon, said nipple and shell having adjoining walls formed with a slot therein; an actuator pin piston slidable in said shell; an actuator rotatable relative to said piston and also slidable in said shell, said actuator being formed on its periphery with oppositely inclined opposed cam surfaces in offset relation to each other and pockets opposed to said cam surfaces, one deep and the others shallow; an actuator pin in said piston and slidable in said slot; a valve housing on said nipple and having a passage for pressure fluid communicating with said intake port; a valve control rod on said piston and slidable through a portion of said housing, and hermetically slidable through one end of said shell; a valve in said passage and in spaced relation to said rod so that said rod will resist said valve in moving to close said passage only while said actuator is in its lower position; and a guide pin adapted to secure said actuator in said lower position when said guide pin is engaged in said deep pocket and in its upper position while engaged within one of said shallow pockets.

7. In a differential flow device adapted to be remotely controlled by an operating tool in a tubing: a nipple adapted to be connected into said tubing; a lateral shell on said nipple, said nipple and shell having adjoining walls formed with a slot therein; closure means for one end of said shell; an actuator pin piston slidable in said shell; an actuator upon said piston and having a peripheral opening therearound, said opening forming, upper and lower opposed and oppositely inclined cam surfaces in spaced offset relation to each other, two upper pockets, one deep and the other shallow, alternating between said upper cam surfaces, and two lower pockets alternating between said lower cam surfaces, said actuator being slidable in said shell and rotatable relative to said piston; an actuator spring urging said actuator and piston away from said closure means; an actuator pin in said piston and extending slightly into said nipple, said pin being slidable in said slot and engageable by said tool; differential valve means for admitting pressure fluid into said tubing during low differentials and excluding such fluid during relatively high differentials, said means being coefficient with said piston and spring; and a guide pin in said shell, said pin extending into said opening and being adapted to be alternately engaged within one of said pockets and upon one of said cam surfaces to cause partial rotation of said actuator each time said actuator is reciprocated a predetermined distance so as to resist said differential valve in closing said passage when said guide pin is engaged within said deep upper pocket and to offer no resistance to said valve when said guide pin is engaged within said shallow upper pocket.

8. In a differential flow device adapted to be remotely controlled by an operating tool in a tubing: a nipple adapted to be connected into said tubing; a shell on said nipple; an actuator pin piston slidable in said shell; an actuator upon said piston and rotatable relative thereto in said shell; an actuator pin on said piston, said pin being operable from within said tubing to move said actuator and piston in one direction; an actuator spring in said shell, said spring resiliently urging said actuator and piston in the opposite direction; oppositely sloping helically inclined cam surfaces upon said actuator in offset relation to each other, and an equal number of pockets, one deep and the others shallow, upon said actuator, said pockets alternating with said cam surfaces and being opposed thereto; a guide pin coefficient with said cam surfaces and pockets; members providing a passage for pressure fluid into said nipple; and a valve in said passage, said valve being adapted to close said passage in two positions, one of said positions being due to gravity and the other due to pressure fluid force in said passage, said force being opposed by said spring.

9. In a differential flow device adapted to be remotely controlled by an operating tool in a tubing: a nipple adapted to be secured in said tubing; a shell on said nipple, said nipple and shell having adjoining walls formed with a slot therein; an actuator pin piston slidable in said shell; an actuator also slidable in said shell and rotatable relative to said housing; an actuator pin in said housing and slidable in said slot; a guide pin in said shell, said pin being engageable within a perpheral opening of said actuator, said opening forming opposed and offset helically inclined cam surfaces and pockets between said cam surfaces, one of said pockets being deep and the others shallow; a combination differential and actuator spring in said shell; members providing a passage for pressure fluid into said nipple; and a combination differential and check valve, each adapted to close said passage, said check valve seating by gravity and said differential valve being resisted by force of said spring.

10. In a differential flow device adapted to be remotely controlled by an operating tool in a tubing: a nipple adapted to be connected into said tubing and having a pressure fluid intake port; a lateral shell on said nipple, said nipple and shell having adjoining walls formed with a slot therein; closure means for one end of said shell; an actuator pin piston slidable in said shell; an actuator upon said piston and having a peripheral opening therearound, said opening forming, two upper and two lower opposed helisally inclined cam surfaces in spaced offset relation to each other, said opposed cam surfaces sloping in opposite directions, two upper pockets, one deep and the other shallow, alternating between said upper cam surfaces, and two lower pockets alternating between said lower cam surfaces, said actuator being slidable in said shell and rotatable relative to said piston; an actuator spring urging said actuator and piston away from said closure means; an actuator pin in said piston and extending slightly into said nipple, said pin being slidable in said slot and engageable by said tool; a valve control rod on said piston and hermetically slidable through said shell; a slide valve on said rod, said valve being adapted to close said port in one position of said piston; a spring on said rod; a valve on said spring, said last valve being adapted to close said port by force of pressure fluid flowing into said port in another position of said piston; and a guide pin in said shell, said pin extending into said opening and being adapted to alternately engage within one of said pockets and upon one of said cam surfaces to cause partial rotation of said actuator each time said actuator is reciprocated a predetermined distance so as to place said last valve in spaced relation to said port when said guide pin is engaged within said shallow upper pocket and to place said slide valve over said port when said guide pin is engaged within said deep upper pocket.

11. In a differential flow device adapted to be remotely controlled by an operating tool in a tubing: a nipple adapted to be connected into said tubing; a shell on said nipple; an actuator pin piston slidable in said shell; an actuator secured upon said piston and rotatable relative thereto in said shell, said actuator having oppositely sloping helically inclined cam surfaces in offset relation to each other, and an equal number of pockets, one deep and the others shallow, said pockets alternating with said cam surfaces and being opposed thereto; an actuator pin on said piston, said pin being operable from within said tubing to move said actuator and piston in one direction; an actuator spring in said shell, said spring resiliently urging said actuator and piston in the opposite direction; a guide pin coefficient with said cam surfaces and pockets; a passage for pressure fluid into said nipple, in combination with; a differential valve and a slide valve in spaced relation to and governed by said piston, said differential valve being adapted to close said passage in one position of said piston and said slide valve being adapted to close said passage in another position of said piston.

12. In a remotely controlled flow device: a nipple; a shell thereon; a spring loaded actuator assembly in said shell; means for resiliently securing said assembly in two positions, said means comprising a guide pin coefficient with inclined cam surfaces and an actuator pin adapted to be releasably engaged by an operating tool; a member providing an intake passage for pressure fluid into said nipple; and two valves controlling said passage, said valves being positionally coefficient with the spring of said assembly so that one of said valves will be seated in one position of said assembly and the other of said valves will be resisted in seating in the other position of said assembly.

13. In a remotely controlled flow device: an actuator having peripheral helically inclined cam surfaces adapted to be coefficient with means for rotating said actuator as the same is reciprocated relative to said means and two pockets, one deeper than the other, for coefficient relation with means for securing said actuator in two positions longitudinally; an actuator pin piston upon said actuator; a thrust bearing upon one end of said actuator; a thrust bearing between said actuator and piston; an actuator pin in said piston; a valve and valve engaging means on said piston.

14. In a remotely controlled flow device, the combination of: a nipple having a pressure fluid intake port; a valve control rod parallel with and in spaced relation to said nipple; a slide valve on said rod; a spring on said rod; a valve on said spring; and actuator means for alternately effecting the positioning of said valves relative to said passage, substantially as described.

15. In a remotely controlled flow device of the character described: a tubing having a pressure fluid intake port; a valve carried by said tubing and controlling communication through said port, said valve being adapted to be moved to opened and closed positions; an actuator movable to effect changes in the position of said valve; and yieldable means to cause valve changing movement of said actuator, said yieldable means normally maintaining said valve in an opened position but which may be overcome by high pressure differentials to cause said valve to close.

16. In a remotely controlled flow device of the character described: a tubing having a pressure fluid intake port; a valve carried by said tubing and controlling communication through said port, said valve being adapted to be moved to opened and closed positions; an actuator movable to effect changes in the position of said valve; and spring means for causing valve changing movement of said actuator, and for yieldably maintaining said valve in an opened position, said spring means being yieldable to high pressure differentials to cause said valve to close.

17. In a remotely controlled flow device: a tubing having a pressure fluid intake port; a valve carried by said tubing and controlling communication through said port, said valve being movable to a closed position by fluid pressure; movable means carried by said tubing to limit such movement and maintain said valve in an opened position; and spring means for moving said movable means and for maintaining said valve opened, said spring means being yieldable to high pressure differentials to close said valve.

18. In a line of tubing wherein a number of flow devices are located at spaced intervals in the length of the tubing: a flow device comprising a nipple adapted to be connected in the string of tubing and having a slot; a lateral shell on said nipple; members providing a passage for pressure fluid into said nipple; a combination differential and check valve, each adapted to close said passage, said check valve seating by gravity; a combination differential and actuator spring in said shell, said differential valve being resisted by force of said spring; a step-by-step moving actuator, located in said shell, for compressing said spring upon one step of movement and releasing same upon the next-succeeding step of movement, said actuator including means wholly located in said shell for securing said spring in its compressed position after said one step of movement and for effecting release of said spring on said next succeeding step of movement in order that said spring may act on said valve; an actuator pin carried by said actuator and projecting through the said slot into said nipple; and a suitable tool operable in said nipple and having provisions for cooperating with said pin for purposes described.

ALEXANDER BOYNTON.